United States Patent [19]

Robbins

[11] Patent Number: 4,713,089
[45] Date of Patent: Dec. 15, 1987

[54] SYSTEM AND METHOD FOR REMOVING VOLATILE COMPONENTS FROM AN AQUEOUS MEDIUM

[75] Inventor: Lanny A. Robbins, Midland, Mich.

[73] Assignee: The Dow Chemical Company, Midland, Mich.

[21] Appl. No.: 886,693

[22] Filed: Jul. 18, 1986

[51] Int. Cl.⁴ .................................. B01D 19/00
[52] U.S. Cl. ................................ 55/52; 55/54; 55/198; 203/24; 203/26; 203/DIG. 8; 203/91; 202/205
[58] Field of Search ...................... 55/39–44, 55/46, 48–51, 52, 54, 196, 198; 203/24, 26, 91, DIG. 4, DIG. 8; 202/205

[56] References Cited

U.S. PATENT DOCUMENTS 3,898,058 8/1975 McGill ................................ 55/50
4,177,137 12/1979 Kruse ................................ 203/26

Primary Examiner—Bernard Nozick
Attorney, Agent, or Firm—V. Dean Clausen

[57] ABSTRACT

A system and method is disclosed for removing dissolved organic impurities, such as gasoline or other hydrocarbons, from groundwater. The contaminated water is fed into a stripper column, operated under a deep vacuum, to enable the water to enter the column at its boiling point. Steam, as a vaporizing gas, strips the impurities out of the water and the overhead vapor phase is compressed to boost it to a higher pressure, so it can be condensed to vaporize part of the bottoms stream from the column. Since the bottoms stream is mostly water, the vapor generated is the steam used to strip impurities from the water.

4 Claims, 1 Drawing Figure

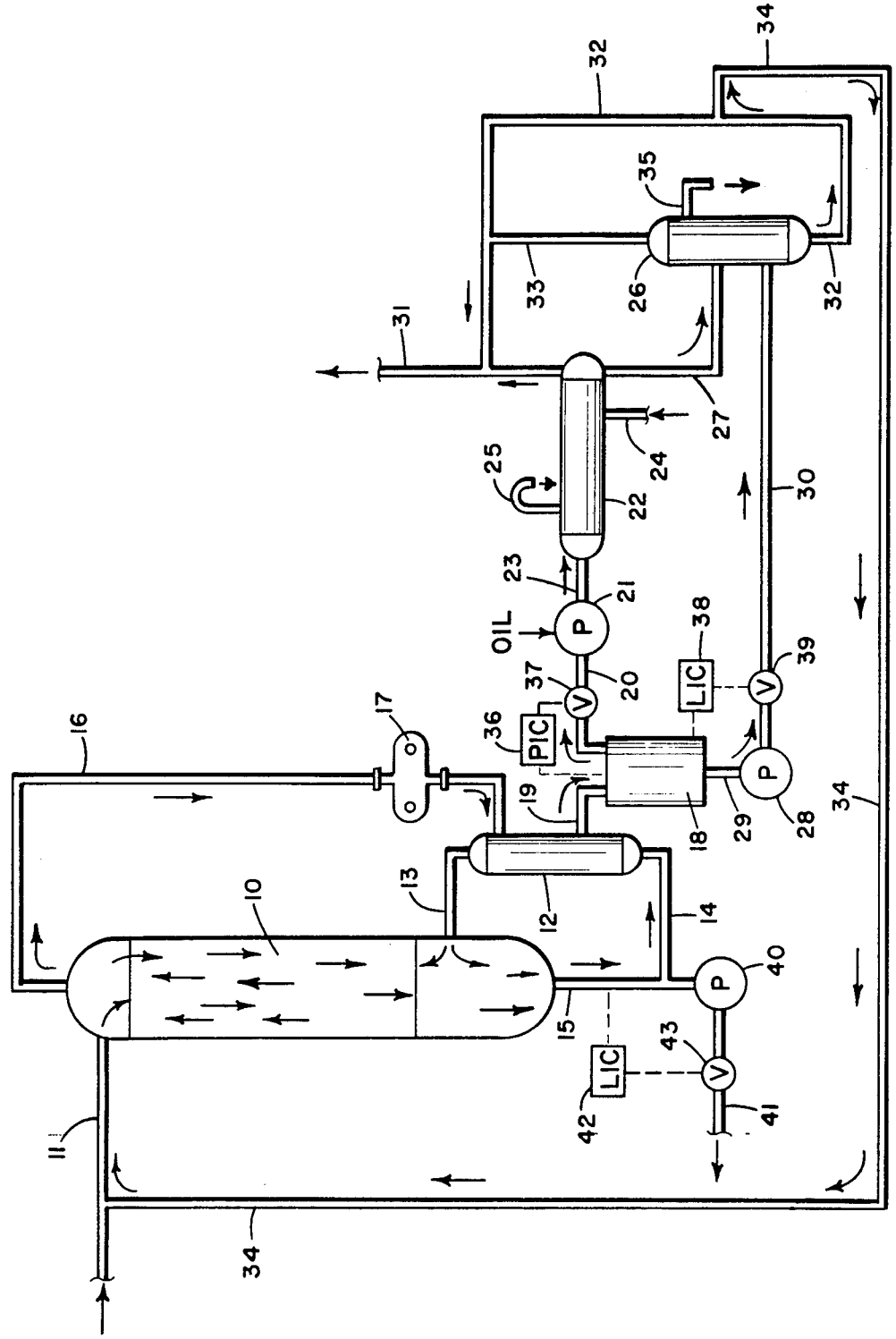

SYSTEM AND METHOD FOR REMOVING VOLATILE COMPONENTS FROM AN AQUEOUS MEDIUM

BACKGROUND OF THE INVENTION

This invention relates to a system and method for removing volatile components from an aqueous medium. More particularly, the invention is directed to removing dissolved impurities from water by steam-stripping the impurities under deep vacuum conditions.

A major problem today is contamination of groundwater by hydrocarbons, such as gasoline, benzene, toluene, or xylene, that leak out of underground storage tanks. Groundwater can also be contaminated by chlorinated solvents, such as trichloroethylene, trichloroethane, perchloroethylene, and methylene chloride, which are used in degreasing operations and then dumped into open pits in the ground.

One way to remove organic impurities from groundwater is by a technique referred to as steam-stripping. In a typical steam-stripping process, the contaminated water is first passed through a heat exchanger to bring its temperature up to about 180°–200° F. and then it is directed into the top of a stripper column. Steam, as the vaporizing gas, enters the column near the bottom and flows upwardly at about 212°–240° F. As the downwardly moving water and the upwardly moving steam make contact inside the tower, the steam and water are at about the same temperature until the steam begins to contact the cooler incoming feed water near the top of the column.

At this point the steam condenses on the cooler feed water to heat the water to its boiling point. Since much of the steam is consumed in heating the cooler feed water, only a very small amount of steam is available for vaporizing the hydrocarbon impurities and carrying the impurities out of the column in the vapor phase. As the vapor phase leaves the column, it is passed through a heat exchanger to condense the vapors to a mixture of water and the organic impurities (oil). The oil is separated from the water in a decanter vessel and the oil phase is discharged to an incinerator, or carried to another point for further processing. The water phase, which is still saturated with dissolved impurities, is recycled back to the column and stripped again to remove the impurities.

The steam-stripping procedure described above has a major drawback. As pointed out in the description, only a small amount of steam is available, as a vaporizing gas, to carry the impurities out of the stripper column. Therefore, the amount of steam required to operate under such conditions is relatively high and the process is costly to operate. The present invention overcomes this problem by operating the stripper system at a reduced pressure, that is, under a vacuum condition, so that the feed water can enter the column at its boiling point.

SUMMARY OF THE INVENTION

The invention provides a system and method for removing volatile components from an aqueous medium, such as water that contains volatile components. Examples of the volatile components are those described earlier, namely, certain hydrocarbons and chlorinated solvents, which represent impurities in the water. In practice, the contaminated water is fed into a stripper column, usually at the top of the column. Vaporizing gas, in the form of steam, enters the column near the bottom from a reboiler located adjacent to the column, or from a steam generator that may be located remote from the column. As the steam flows upwardly in the column, it contacts the downwardly flowing water phase and vaporizes the volatile impurities. During the stripping operation a vacuum pump creates a negative pressure condition in that part of the system which includes the column.

The overhead vapor phase containing the volatile impurities is directed into a vapor compressor, which compresses the vapor to raise its pressure to a point below atmospheric pressure. The pressurized vapor is then passed into a condenser, which condenses part of the vapor phase and thus forms a liquid phase and a vapor phase. The liquid and vapor phases are then passed into a receiver vessel. This vessel separates the phases, so that the liquid phase contains water and the condensed volatile impurities, and the vapor phase contains noncondensable components. From the receiver vessel, the vapor phase is drawn into the vacuum pump, which raises its pressure to atmospheric pressure. The liquid phase from the receiver vessel is carried into a decanter vessel.

When the vapor phase reaches atmospheric pressure, it passes into a second condenser, where part of it is condensed to form a liquid phase and a vapor phase. The vapor phase in this condenser is discharged from the condenser and the liquid phase passes into a decanter vessel. The decanter vessel separates part of the condensed volatile impurities from the water phase, and these components are discharged from the decanter vessel. The water phase, which still contains some of the condensed volatile components, is also discharged from the decanter vessel.

DESCRIPTION OF THE DRAWING

The single figure of the drawing is a schematic illustration of one embodiment of a steam-stripping system according to this invention.

DESCRIPTION OF THE INVENTION

In the description that follows, the term "aqueous medium" means water containing a volatile component, or a mixture of volatile components. The term "volatile components," as used herein, means compounds having a relative volatility to water greater than 1.0 when they are dissolved in water. Examples of these components include hydrocarbons, such as gasoline, benzene, toluene, or xylene, and chlorinated solvents, such as trichloroethylene, trichloroethane, perchloroethylene, or methylene chloride, and mixtures thereof.

Referring to the drawing, the steam-stripping system illustrated therein includes a stripper column 10. In the practice of this invention, it is preferred to use a conventional packed tower, or tray tower of the type used for distillation or rectification. Water contaminated with the organic impurities described above is carried into column 10 through the inlet line 11 at the top of the column. A reboiler 12 is connected into the column by a steam line 13, that enters the column near the bottom. At the bottom of reboiler 12 is a water inlet line 14 that joins into a discharge line 15 from column 10.

A vapor compressor 17 is installed in line 16 between the column and the reboiler. The reboiler 12 is a conventional shell and tube heat exchanger, or plate and frame heat exchanger; and the vapor compressor 17 is a rotary lobe compressor. Adjacent to reboiler 12 is a receiver vessel 18, which connects into the reboiler through inlet line 19. An outlet line 20 connects the receiver vessel 18 into the suction side of a vacuum pump 21. The discharge side of pump 21 is connected into a condenser 22 by a discharge line 23.

For the vacuum pump 21 it is preferred to use a single pass oil lubricated pump, and the condenser 22 is a conventional shell and tube heat exchanger, or a plate and frame heat exchanger. In the drawing, condenser 22 is illustrated as being a shell and tube heat exchanger, in which cooling water enters the shell side of the heat exchanger through an inlet line 24, and is discharged through a discharge line 25. Condenser 22 is connected into a decanter vessel 26 by line 27. Receiver 18 is connected into the inlet side of a pump 28 by line 29, and the outlet side of the pump is connected by line 30 into the decanter vessel 26.

Condenser 22 also includes a vent line 31, for venting waste products to the atmosphere, or to a use point. A discharge line 32 and vent line 33, from decanter 26, are joined into the vent line 31, to equalize the pressure in decanter 26 with that in condenser 22. Discharge line 32 is also connected into the inlet line 11 (for column 10) by a recycle line 34. The decanter 26 also includes an outlet fitting 35, which is installed near the top of the vessel.

OPERATION

To illustrate the practice of this invention, a typical operation of the steam-stripping system will now be described. The operation involves removing toluene from a supply of groundwater, to make the water suitable for human consumption. In the operation of this system, the water contaminated with toluene is fed into the stripper column 10 through inlet line 11 at about 150,000 lb/hr. The temperature of the incoming water is about 50° F. and the concentration of toluene dissolved in the water is about 10 ppm. The water flows downwardly in the column, as indicated by the downwardly directed arrows. At the same time, steam from the reboiler 12 flows upwardly (countercurrent) to the water, in the column.

When the upwardly moving steam makes contact with the downwardly moving water, the steam vaporizes the more volatile toluene and the vapor phase is carried overhead through outlet line 16 into the vapor compressor 17. During the stripping operation, the vacuum pump 21 creates a negative pressure condition, of about 10 mm Hg absolute, in the stripper column 10 and that part of the system between the column and the compressor 17. As the vapor phase enters the compressor 17, it is compressed to raise the pressure to about 25 to 50 mm Hg absolute. Increasing the pressure on the vapor phase allows the steam to condense at about 78° F. to 100° F. when it enters the reboiler 12.

When the vapor phase is condensed in reboiler 12, the resulting mixture contains inert materials, which are nondendensable, and it also contains toluene and water vapor. The noncondensable components consist mostly of air that is dissolved in the feed water, or that the steam picks up as it moves through the stripper system. The condensate (liquid phase) formed in the reboiler is also saturated with the toluene impurities. From reboiler 12 the condensate and the vapor phase are carried into receiver 18. Inside the receiver vessel the two phases separate and the vapor phase is drawn into the suction side of vacuum pump 21.

The pressure condition in the system between the column and the vacuum pump is controlled by a pressure indicator controller 36 (PIC), which includes an automatically-operated valve 37 (pneumatic or electrical operation). In the vacuum pump 21, the pressure of the vapor phase is boosted up to 760 mm Hg absolute, i.e., atmospheric pressure. From pump 21 the vapor phase is discharged into condenser 22, on the tube side, and cooling water enters the condenser on the shell side, through inlet line 24 and leaves the condenser through discharge line 25. When the vapor phase contacts the cooler tubes, part of the vapor phase condenses to a liquid mixture of water and toluene, which is passed into decanter vessel 26 through line 27. The condensate also contains some of the oil lubricant which passes through the vacuum pump 21. That part of the vapor phase containing the noncondensable components is discharged from condenser 22 into the atmosphere, or to a use point, through vent line 31.

Pump 28 draws the condensate phase out of the receiver vessel 18 through line 29 and pumps it into decanter 26 through line 30. The liquid level in receiver 18 is controlled by a liquid indicator control 38 (LIC), which includes an automatically-operated valve 39. Inside the decanter 26 the toluene and the oil lubricant are separated from the water in the condensate phase and the toluene and oil are disposed of through the outlet fitting 35. The water, which is saturated with toluene, is discharged into recycle line 34 and returned to the stripper column 10 through the inlet line 11.

After the contaminated water passes down through the stripper column 10, the concentration of dissolved toluene is reduced to about 4 ppb, so that the water is essentially clean. Pump 40 withdraws part of the clean water from column 10 through discharge line 15 and pumps it through line 41 to a use point or a storage point. The liquid level in column 10 is regulated by a liquid indicator control 42 (LIC), which includes an automatically-operated valve 43. Some of the clean water in line 15 passes into reboiler 12 through line 14, where it is vaporized to provide the steam used in the stripping operation. The water that doesn't vaporize drops into line 15 and is pumped out of the column by pump 40.

The invention claimed is:

1. A system for removing volatile components from an aqueous medium, the system comprises:
   a column (10) that receives an aqueous medium containing volatile components through an inlet line (11) that communicates with the column (10), and the column (10) receives steam as a vaporizing gas through a steam line (13) that connects the column (10) to a reboiler (12), the aqueous medium and steam flow countercurrent to each other in the column (10), and the steam vapor vaporizes the volatile components;
   a vapor compressor (17) that communicates with the column (10) and the reboiler (12), the vapor is compressed by the vapor compressor (17) to raise its pressure to a point below atmospheric pressure, and the reboiler (12) condenses part of the steam vapor, to provide a liquid phase and vapor phase;
   a receiver vessel (18) that communicates with the column (10) and the reboiler (12), the receiver vessel (18) separates the liquid phase and the vapor phase, the liquid phase contains water and the condensed volatile components, and the vapor phase contains non-condensable components;

a vacuum pump (21) that communicates with the receiver vessel (18) and a condenser (22), the vacuum pump (17) causes a negative pressure condition in the column (10) and in that part of the system between the column (10) and the pump (21), the vapor phase from the receiver vessel (18) is delivered to the vacuum pump (2), which raises the pressure of said vapor phase to atmospheric pressure, the vapor phase is then delivered to the condenser (22), which condenses part of the vapor phase, to provide a liquid phase and a vapor phase;

a decanter vessel (26) that communicates with the condenser (22), the receiver vessel (18) and the column (10), the liquid phase from the receiver vessel (18), and the condenser (22) are carried into the decanter vessel (26), which separates part of the condensed volatile components from the water phase and these components are discharged from the decanter vessel (26), and the water phase containing the remaining condensed volatile components is discharged from the decanter vessel (26).

2. A method for removing volatile components from an aqueous medium, comprising the steps of:

passing into a column an aqueous medium containing volatile components, and steam as a vaporizing gas;

flowing the aqueous medium and the steam vapor through the column countercurrent to each other;

contacting the aqueous medium with the steam vapor to vaporize the volatile components, and causing a negative pressure condition in the column;

passing the steam vapor containing the volatile components into a vapor compressor, and compressing the steam vapor to raise its pressure to a point below atmospheric pressure;

passing the pressurized steam vapor into a first condenser, to condense part of the vapor phase, and thereby form a liquid phase and a vapor phase;

passing the liquid phase and vapor phase into a receiver vessel, to separate these phases, such that the liquid phase contains water and the condensed volatile components, and the vapor phase contains noncondensable components;

passing the vapor phase from the receiver vessel into a vacuum pump to raise the pressure of this phase to atmospheric pressure;

passing the liquid phase from the receiver vessel into a decanter vessel;

passing the vapor phase from the vacuum pump into a second condenser, to condense part of the vapor phase, and thereby form a liquid phase and a vapor phase;

discharging the vapor phase from the second condenser;

passing the liquid phase from the second condenser into the decanter vessel, to separate part of the condensed volatile components from the water phase;

discharging the condensed volatile components from the decanter vessel; and discharging the water phase containing the remaining condensed volatile components from the decanter vessel.

3. The method of claim 2 in which the pressure on the steam vapor in the column is about 10 mm Hg.

4. The method of claim 2 in which the steam vapor is compressed to raise its pressure to a range of from about 25 mm Hg to about 50 mm Hg, and most of the water in the vapor is condensed at about 78° F. to about 100° F.

* * * * *

UNITED STATES PATENT AND TRADEMARK OFFICE
CERTIFICATE OF CORRECTION

PATENT NO. : 4,716,089

DATED : Dec. 29, 1987

INVENTOR(S) : YAMAZAKI

It is certified that error appears in the above-identified patent and that said Letters Patent is hereby corrected as shown below:

TITLE PAGE:

Item [62], "abandoned" should read
-- Pat. No. 4,666,803 --.

Signed and Sealed this

Twelfth Day of July, 1988

Attest:

DONALD J. QUIGG

Attesting Officer

Commissioner of Patents and Trademarks